United States Patent
Chang

(10) Patent No.: US 7,758,199 B2
(45) Date of Patent: Jul. 20, 2010

(54) OPTICAL PLATE AND BACKLIGHT MODULE USING SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 58 days.

(21) Appl. No.: 12/197,319

(22) Filed: Aug. 25, 2008

(65) Prior Publication Data

US 2009/0262528 A1 Oct. 22, 2009

(30) Foreign Application Priority Data

Apr. 16, 2008 (CN) .......................... 2008 1 0301143

(51) Int. Cl.
*G09F 13/04* (2006.01)
(52) U.S. Cl. .................... 362/97.3; 362/617; 362/621; 362/628
(58) Field of Classification Search ....... 362/97.1–97.3, 362/610, 606, 615–617, 621, 619, 628
See application file for complete search history.

(56) References Cited

U.S. PATENT DOCUMENTS

| 5,598,280 | A | * | 1/1997 | Nishio et al. | ................... 349/57 |
| 5,999,685 | A | * | 12/1999 | Goto et al. | ................... 385/146 |
| 2005/0146872 | A1 | * | 7/2005 | Chang et al. | ................. 362/246 |
| 2006/0082884 | A1 | * | 4/2006 | Feng et al. | .................... 359/569 |
| 2008/0068862 | A1 | * | 3/2008 | Shimura | ..................... 362/619 |
| 2008/0192504 | A1 | * | 8/2008 | Chou | ......................... 362/612 |

* cited by examiner

*Primary Examiner*—Jong-Suk (James) Lee
*Assistant Examiner*—Julie A Shallenberger
(74) *Attorney, Agent, or Firm*—Zhigang Ma

(57) ABSTRACT

An exemplary optical plate includes a transparent main body. The transparent main body includes a first surface and a second surface. The first surface and the second surface are on opposite sides of the main body. The first surface of transparent main body defines a plurality of elongated arc-shaped grooves. The second surface defines a plurality of the elongated arc-shaped protrusions. An extending direction of the elongated arc-shaped grooves intersects with an extending direction of the elongated arc-shaped protrusions.

4 Claims, 5 Drawing Sheets

OPTICAL PLATE AND BACKLIGHT MODULE USING SAME

BACKGROUND OF THE INVENTION

1. Field of the Invention

The present invention relates to an optical plate and a backlight module using the same and, particularly, to an optical plate and a backlight module using the same employed in a liquid crystal display.

2. Description of the Related Art

Referring to FIGS. 4 and 5, a typical direct type backlight module 100 includes a frame 11, a plurality of light sources 12, a light diffusion plate 13, and a prism sheet 10 The light sources 12 are disposed in an inner side of the frame 11. The light diffusion plate 13 and the optical plate 10 are disposed on the light sources 12 above a top of the frame 11 in that order. The light diffusion plate 13 includes a plurality of diffusing particles (not shown) configured for diffusing light. The optical plate 10 includes a transparent substrate 101 and a prism layer 103 formed on a surface of the transparent substrate 101. The prism layer 103 forms a plurality of elongated V-shaped protrusions 105.

In use, light from the light sources 12 enters the diffusion plate 13 and becomes scattered. The scattered light leaves the diffusion plate 13 to the prism sheet 10. The scattered light then travels through the optical plate 10 and is refracted out at the elongated V-shaped protrusions 105 of the prism sheet 10 Thus, the refracted light leaving the optical plate 10 is concentrated at the prism layer 102 and increases the brightness (illumination) of the prism sheet 10 The refracted light then propagates into a liquid crystal display panel (not shown) disposed above the prism sheet 10

However, although light from the light sources 12 enters the diffusion plate 13 and becomes scattered, after light leaving the optical plate 10, light spot of the light sources 12 often occurs.

In order to reduce or eliminate the light spot of the light sources 12, the backlight module 100 should further include an upper light diffusion film 14 disposed on the prism sheet 10 However, although the upper light diffusion film 14 and the optical plate 10 are in contact with each other, a plurality of air pockets still exist at the boundary between the light diffusion film 14 and the prism sheet 10 When the liquid crystal display device 100 is in use, light passes through the air pockets, and some of the light undergoes total reflection at one or another of the corresponding boundaries. In addition, the upper light diffusion film 14 may absorb an amount of the light from the prism sheet 10. As a result, the brightness of light illumination of the liquid crystal display device 100 is reduced.

Therefore, a new optical plate is desired in order to overcome the above-described shortcomings.

SUMMARY

An optical plate includes a transparent main body. The transparent main body includes a first surface and a second surface. The first surface and the second surface are on opposite sides of the main body. The first surface of transparent main body defines a plurality of elongated arc-shaped grooves in the first surface. The second surface defines a plurality of the elongated arc-shaped protrusions. An extending direction of the elongated arc-shaped grooves intersects with an extending direction of the elongated arc-shaped protrusions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe embodiments of the present optical plate in detail.

Figure 1:
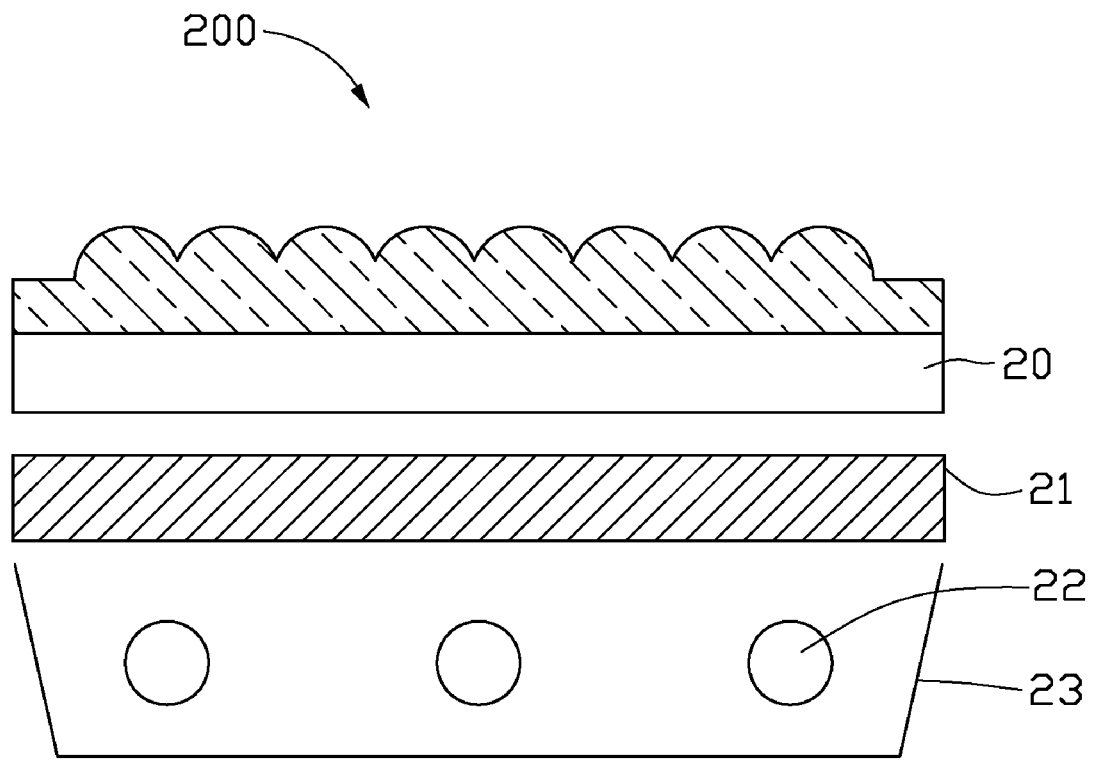
FIG. 1 is a side cross-sectional view of a backlight module in accordance with an exemplary embodiment of the present invention.

Referring to FIG. 1, in an exemplary embodiment, a backlight module 200 includes an optical plate 20, a light diffusion plate 21, a plurality of linear light sources 22, and a frame 23. The linear light sources 22 are disposed in an inner side of the frame 23. In the illustrated embodiment, the linear light sources 22 are cold cathode tubes. The light diffusion plate 23 and the optical plate 20 are disposed on the light sources 12 above a top of the frame 23 in that order.

Figure 2:
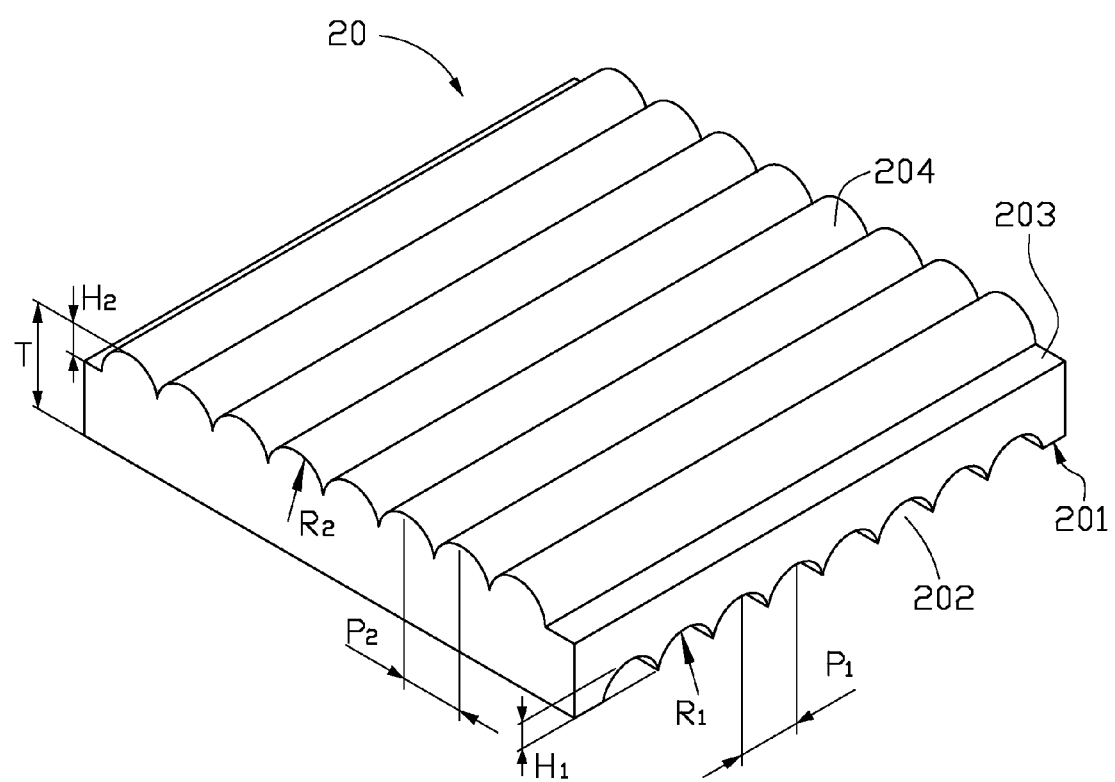
FIG. 2 is an isometric view of an optical plate of the backlight module in FIG. 1.

Referring to FIG. 2, the optical plate 20 includes a main body (not labeled). The main body includes a first surface 201 and a second surface 203. The first surface 201 and the second surface 203 are on opposite sides of the main body. The first surface 201 defines a plurality of elongated parallel arc-shaped grooves 202. A plurality of elongated parallel arc-shaped protrusions 204 are formed on the second surface 203. An extending direction of the elongated arc-shaped grooves 202 intersects with an extending direction of the elongated arc-shaped protrusions 204. In the illustrated embodiment, the extending direction of the elongated arc-shaped protrusions 204 is parallel to a longitudinal direction of the linear light sources 22.

In the illustrated embodiment, the cross-section of each arc-shaped groove 202 taken along a plane perpendicular to an extending direction of the elongated arc-shaped grooves 202 is substantially semicircular. The elongated arc-shaped grooves 202 are distributed side by side to each other in the first surface 201. The radius $R_1$ defined by each elongated arc-shaped groove 202 is preferably in the range from about 0.01 millimeters to about 3 millimeters. The pitch $P_1$ between adjacent elongated arc-shaped grooves 202, measured between two corresponding points on the cross-section lines, is in the range from about 0.025 millimeters to about 1.5 millimeters. The depth $H_1$ of each elongated arc-shaped groove 202 is in the range from about 0.01 millimeters to about 3 millimeters. In the illustrated embodiment, the radius $R_1$ is 0.1375 millimeters, the pitch $P_1$ is 0.275 millimeters, and the depth $H_1$ is 0.11 millimeters.

A cross-section of each arc-shaped protrusion 204 taken along a plane perpendicular to the extending direction of the elongated arc-shaped protrusions 204 is substantially semicircular. The elongated arc-shaped protrusions 204 are side by side distributed in the second surface 203. The radius $R_2$ defined by each elongated arc-shaped protrusion 204 is preferably in the range from about 0.01 millimeters to about 3 millimeters. The pitch $P_2$ of adjacent elongated arc-shaped protrusions 204, measured between two corresponding points on the cross-section lines, is in the range from about 0.025 millimeters to about 1.5 millimeters. The height $H_2$ of each elongated arc-shaped protrusion 204 is in the range from about 0.01 millimeters to about 3 millimeters. In the illustrated embodiment, the radius $R_2$ is 0.1375 millimeters, the pitch $P_2$ is 0.275 millimeters, and the height $H_2$ is 0.11 millimeters.

A thickness T of the optical plate 20 is in the range from about 0.5 millimeters to about 3 millimeters. The optical plate 20 can be made of a material selected from the group consisting of polycarbonate, polymethyl methacrylate, polystyrene, copolymer of methyl methacrylate and styrene.

In the illustrated embodiment, the optical plate 20 is employed in the backlight module 200 in such a manner that the first surface 201 is adjacent to linear light sources 22 and the second surface 203 is away from the linear light sources 22. Light enters the optical plate 20 via the first surface 201. Because the inner surfaces of the elongated arc-shaped grooves 202 are curved and the outer surfaces of the elongated arc-shaped protrusions 204 are also curved, incident light that may have been internally reflected on a flat surface, are refracted, reflected, and diffracted. As a result, light outputted from the second surface 203 is more uniform than light outputted from a light output surface of a conventional optical plate. Light spots caused by the light sources seldom occur. There is no need to add an extra upper light diffusion film between the optical plate 20 and the liquid crystal display panel. Thus, the efficiency of light utilization is enhanced.

The frame 23 is made of metal materials, and has high reflectivity inner surfaces.

Figure 3:
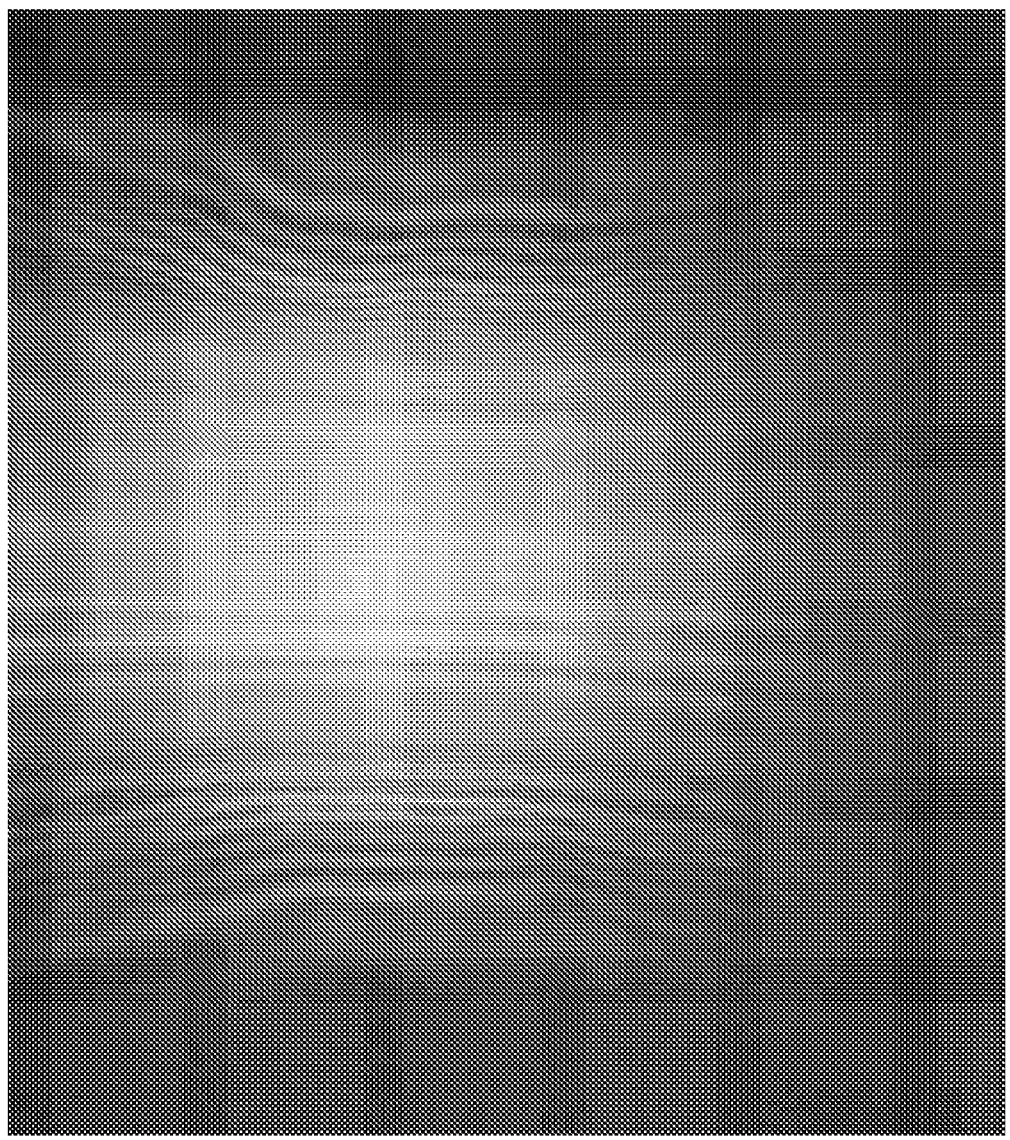
FIG. 3 is a photo for showing an illumination distribution of the optical plate in FIG. 1.
Figure 4:
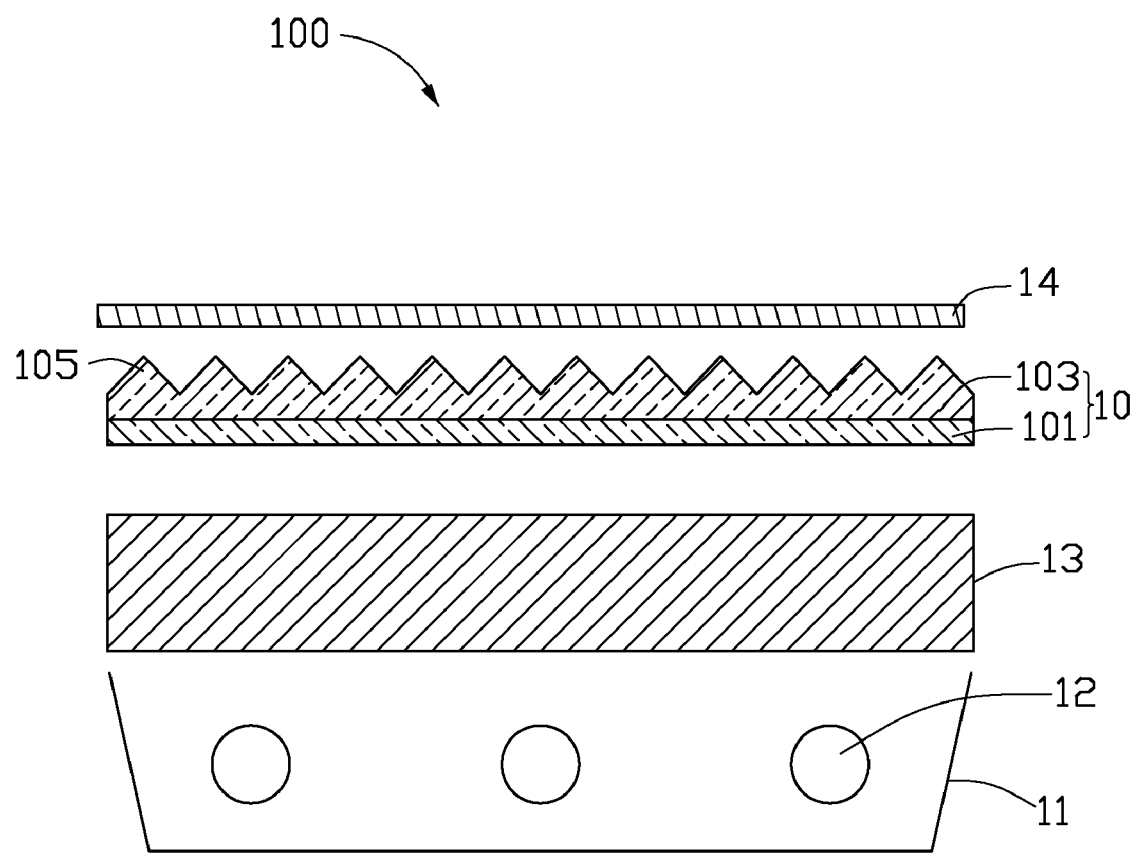
FIG. 4 is a side cross-sectional view of a conventional backlight module.
Figure 5:
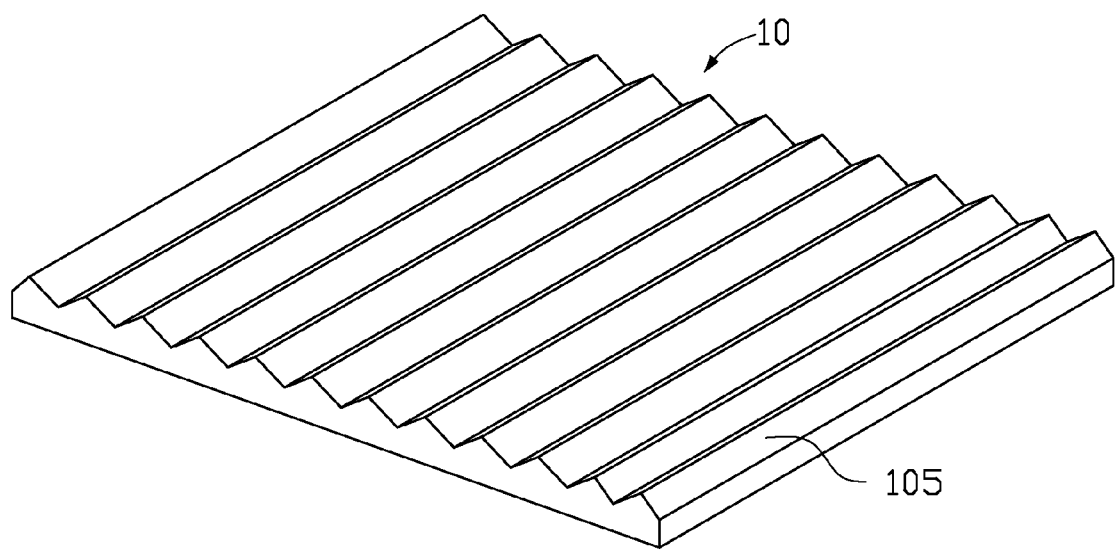
FIG. 5 is an isometric view of the prism sheet in FIG. 4.

Referring to FIG. 3, an illumination distribution of the optical plate 20 is shown. Light emitting from the optical plate 20 forms a uniform surface light source. The test result shows light emitting the optical plate 20 is more uniform. Therefore, when the optical plate 20 is employed in the backlight module 200, light spots of the light sources seldom occur, more uniform light is achieved, there is no need to add an upper light diffusion film between the optical plate 20 and the liquid crystal display panel 25. Thus, the efficiency of light utilization is enhanced.

In addition, in contrast to the conventional optical plate 10, the optical plate 20 is integrally formed by injection molding technology. The optical plate 20 has a better rigidity and mechanical strength than the conventional optical plate because the optical plate 20 is formed as a whole unit integrally. Thus the optical plate 20 has a relatively high reliability.

It can be understood that, the linear light sources 22 can be replaced by a plurality of point light sources such as light-emitting diodes, distributed in rows.

Finally, while the preferred embodiment has been described and illustrated, the invention is not to be construed as being limited thereto. Various modifications can be made to the embodiments by those skilled in the art without departing from the true spirit and scope of the invention as defined by the appended claims.

What is claimed is:

1. A backlight module comprising:
    a frame;
    a plurality of light sources positioned in an inner surface of the frame;
    a light diffusion plate positioned on top of the frame above the light sources; and
    an optical plate positioned on the light diffusion plate, the optical plate including a transparent main body including a first surface and a second surface, the first surface and the second surface being on opposite sides of the main body;
    wherein the transparent main body defines a plurality of elongated arc-shaped grooves in the first surface and a plurality of the elongated arc-shaped protrusions in the second surface, and an extending direction of the elongated arc-shaped grooves intersects with an extending direction of the elongated arc-shaped protrusions.

2. The backlight module as claimed in claim 1, wherein the optical plate is employed in the backlight module in such a manner that the first surface is adjacent to light sources and the second surface is away from the light sources.

3. The backlight module as claimed in claim 1, wherein the light sources are linear light sources.

4. The backlight module as claimed in claim 3, wherein the extending direction of the elongated arc-shaped protrusions parallel to a longitudinal direction of the light sources.

* * * * *